Sept. 21, 1948.   C. G. AGREN   2,449,829
PORTABLE LOADING RAMP
Filed March 17, 1945   2 Sheets-Sheet 1

Inventor
CARL G. AGREN

By Clarence A. O'Brien
and Harvey B. Jacobson
Attorneys

Sept. 21, 1948.   C. G. AGREN   2,449,829
PORTABLE LOADING RAMP
Filed March 17, 1945   2 Sheets-Sheet 2

Inventor
CARL G. AGREN
By Clarence A. O'Brien
and Harvey B. Jackson
Attorneys

Patented Sept. 21, 1948

2,449,829

UNITED STATES PATENT OFFICE 2,449,829

PORTABLE LOADING RAMP

Carl G. Agren, Roberts, Idaho

Application March 17, 1945, Serial No. 583,271

1 Claim. (Cl. 14—72)

This invention relates to an improved portable loading ramp for use in moving hand trucks and the like from one elevation to another.

The primary object of the invention is to provide a loading ramp of the above kind which is conveniently adjustable to correspond with the respective elevations to and from which the hand truck or the like is to be moved.

Another object of the invention is to provide a loading ramp of the above kind which may be readily moved from one location to another and which is easy and convenient to use.

Still another object of the invention is to provide a loading ramp of the above kind which is comparatively simple in construction and otherwise well adapted to meet with the requirements for a successful commercial use.

The present invention consists in the novel form, combination and arrangement of parts hereinafter more fully described, shown in the accompanying drawings and claimed.

In the drawings, wherein like reference characters indicate corresponding parts throughout the several views.

Figure 1:
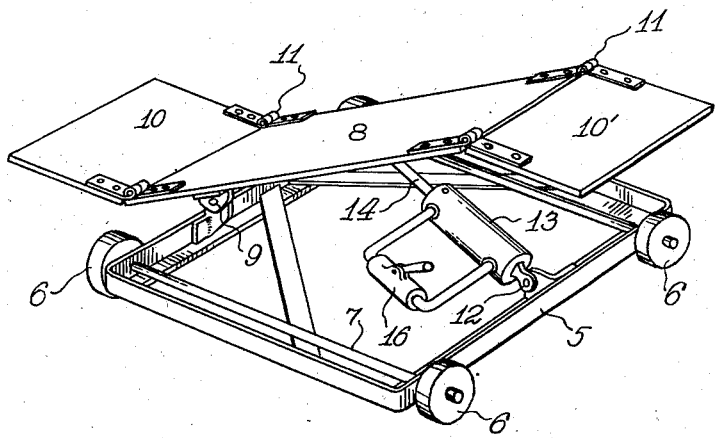
Figure 1 is a perspective view of a portable loading ramp constructed in accordance with the present invention, the deck and approaches being positioned to show the appearance of the ramp when in use.

Referring in detail to the drawings, the present loading ramp includes a horizontal wheeled frame 5 whose supporting wheels are indicated at 6 and may be provided on suitable axles 7 provided at opposite ends of the frame. A flat platform or deck 8 is hinged near one side, as at 9, to one side of the frame 5 so that it may be swung vertically for adjustment to different inclinations. Hinged to opposite side edges of the deck or platform 8 are approach plates 10 and 10', the hinges 11 being provided between adjacent edges of the deck or platform 8 and the approach plates 10 and 10', respectively. Pivoted at one end, as at 12, to the side of frame 5 opposite that at which the deck or platform 8 is hinged, is one end of the cylinder of a jack 13 having its movable jacking member 14 hinged at 15 to the under side of deck or platform 8 intermediate the sides of the latter. The jack 13 is preferably of a fluid pressure type to which fluid under pressure may be suitably supplied by a hand pump 16 carried by the jack cylinder. In using a fluid pressure jack, the movable jacking member 14 is in the form of a piston rod carried by a piston 17 which is movable in the cylinder of the jack. There are many conventional types of jacks on the market which may be used for the purpose and the jack need not be described or illustrated in detail herein.

Figure 2:
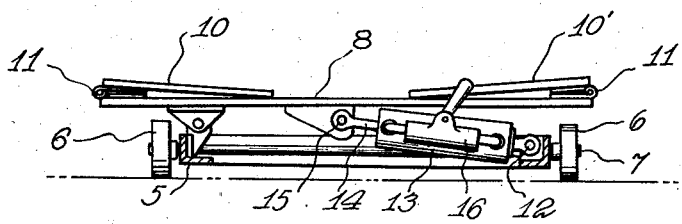
Figure 2 is an end elevational view of the ramp in lowered and folded condition.
Figure 3:
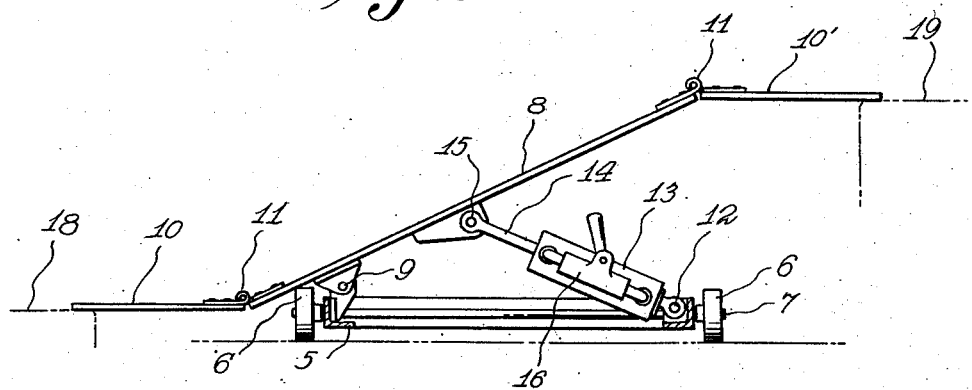
Figure 3 is a view similar to Figure 2 with the ramp conditioned as shown in Figure 1.
Figure 4:
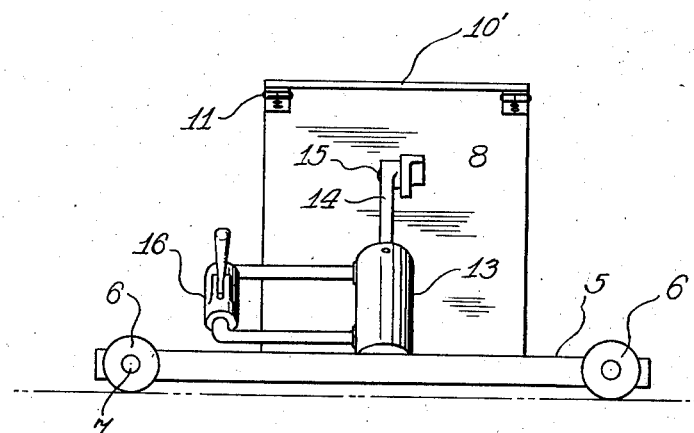
Figure 4 is a side elevation looking toward the left of Figure 3.
Figure 5:
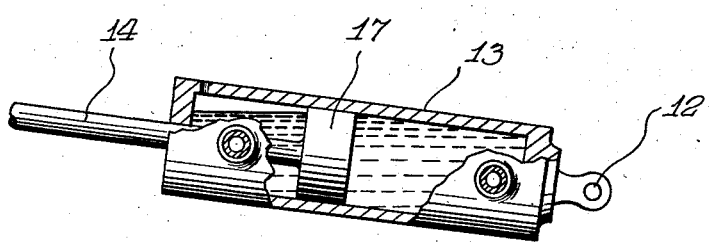
Figure 5 is a view of the jack forming part of the ramp, partly in elevation and partly in longitudinal section.

In using the present loading ramp, one approach plate 10 is disposed to rest upon the floor or ground at one elevation, as indicated at 18, and the deck or platform 8 is jacked to the proper inclination so that the approach plate 10' may rest upon the floor or ground at the higher elevation indicated at 19. When the deck or platform 8 is positioned at the proper inclination, the approach plates 10 and 10' will be positioned substantially horizontal. To adjust the deck or platform 8, pump 16 is operated so as to extend the jack 13 to the desired condition. With the ramp positioned as shown in Figure 3, hand trucks may be readily moved from the elevation 18 to the elevation 19 over approach plate 10 up deck or platform 8 and over approach plate 10', or vice versa. When the device is not in use and is transported from one place to another, the deck or platform 8 may be lowered to a substantially horizontal position and the approach plates 10 and 10' folded onto said deck or platform, as illustrated in Figure 2. Of course, a suitable handle or tongue may be carried by the frame 5 to facilitate movement of the ramp by pulling the same from one place to another.

From the foregoing description, it will be seen that I have provided a very simple and efficient loading ramp of the kind described and one which is efficient in use as well as inexpensive to manufacture and easy to use.

What I claim is:

An adjustable portable loading ramp comprising a horizontal rectangular frame, axles extending transversely of said frame adjacent opposite ends thereof, the ends of said axles projecting through and outwardly of the sides of said frame, supporting wheels journaled on the projecting ends of said axle, a flat platform plate hinged near one side edge upon one side of said frame for vertical swinging movement about an axis parallel with and above said one side of the frame, a jack pivoted to the other side of said frame and pivotally connected to the underside of said platform plate for adjusting the latter from a horizontal position to different lateral inclinations relative to the frame, said platform plate being of such a width and so arranged as to project beyond opposite sides of said frame when in the horizontal position, the hinged side of said platform extending beyond and between the wheels at the adjacent side of the frame when said platform plate is disposed at an inclination, and a flat approach plate hinged to each side edge of the platform plate to fold onto or assume different angular positions relative to the latter.

CARL G. AGREN.

REFERENCES CITED

The following references are of record in the file of this patent:

UNITED STATES PATENTS

| Number | Name | Date |
|---|---|---|
| 1,568,303 | Webster | Jan. 5, 1926 |
| 2,004,095 | Hankins et al. | June 11, 1935 |
| 2,036,654 | Stieler | Apr. 7, 1936 |
| 2,354,922 | McEwen et al. | Aug. 1, 1944 |

FOREIGN PATENTS

| Number | Country | Date |
|---|---|---|
| 169,662 | Great Britain | Oct. 6, 1921 |